Sept. 4, 1934.  P. G. VANNI  1,972,805
INTERNAL COMBUSTION ENGINE
Filed Feb. 16, 1931  2 Sheets-Sheet 1

INVENTOR
Pier G. Vanni
BY
Morrison, Kennedy + Campbell
ATTORNEYS.

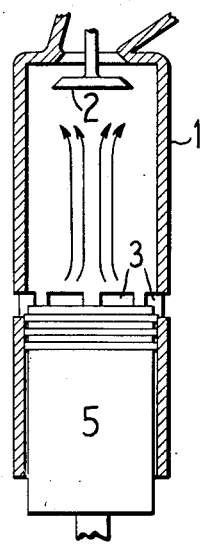 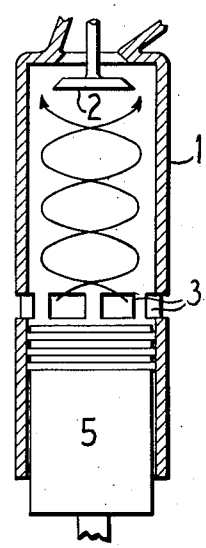 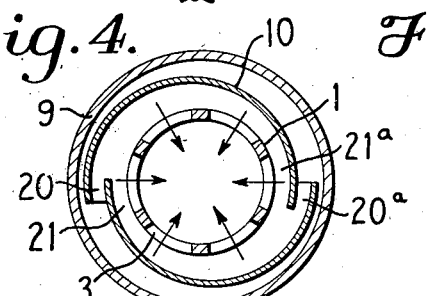 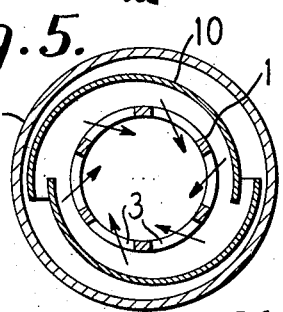 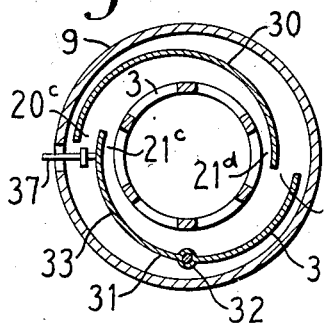 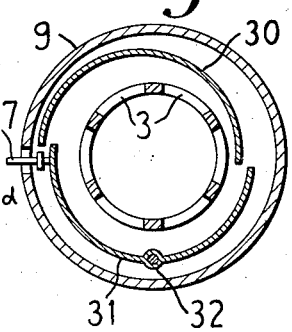 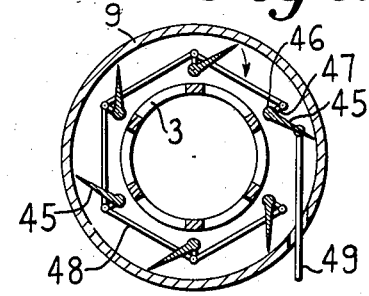

Patented Sept. 4, 1934

1,972,805

UNITED STATES PATENT OFFICE 1,972,805

INTERNAL COMBUSTION ENGINE

Pier Giorgio Vanni, Milan, Italy

Application February 16, 1931, Serial No. 516,012
In Germany March 3, 1930

17 Claims. (Cl. 123—65)

The invention relates to two-cycle internal combustion engines with unidirectional flow of scavenging air, that is, admitted at one end (lower) and exhausted at the other (upper) end of the cylinder, and the main object of the improvements is, to provide a device which is able to afford thorough scavenging, namely by carrying out, first, a scavenging of the nucleus or axial portion of the cylinder, and, later in the scavenging period, the peripheral portion of the volume by a whirling of air with high velocity inside of the cylinder. In part, the disclosure of this application is disclosed in my copending application Serial No. 516,013, filed February 16, 1931.

The principle of the invention is to provide a device for internal combustion engines having unidirectional flow of scavenging air, which is able to obtain successively a radial and a tangential flow of air, utilizing the inertia of a mass of air. This action is obtained by an aerodynamical action which is automatically variable, and which may be regulated in any desired way, so that the scavenging air enters the cylinder in a direction which is a nearly radial one at the commencement of scavenging, and then becomes gradually more and more inclined, so that the burnt gases are thoroughly removed; and a high whirling turbulence is generated, which lasts until and during injection of fuel.

In carrying out the invention there is provided around the cylinder, in the zone of air inlet ports, a ring shaped pipe, chamber or channel of substantial volume into which the air, coming from a surrounding reservoir which may be supplied by a blower, rushes in nearly tangential direction through suitable apertures. Said pipe may contain a plurality of compartments, each corresponding to one or more ports, and it may be constructed so as to be bodily slidable along the cylinder, out of the zone of the ports, so as to expose the ports and establish, when desired, a direct communication between air reservoir and cylinder. The apertures connecting the air reservoir with the various compartments, and these compartments with one another and with the cylinder may be provided with regulating means, adapted to vary their width and direction as desired. The width of said apertures may be controlled by hand or automatically; and the walls of said compartments may be movable, in order that they may be brought into any position comprised between two determined extreme positions, and so that they may produce any required air flow, the direction of which is comprised between two limiting flowing directions.

The absolute and relative dimensions of ports and apertures for passage of air have a great importance in determining the action of the device embodying the invention. When the inlet ports are larger in area than the whirling apertures between the various compartments, there is obtained a greater whirling velocity of air inside of the pipe and inside of the cylinder. The thickness of the cylinder walls should with this invention be kept down as much as possible in the neighborhood of the inlet ports, in order that the inlet ports may be no hindrance to the air entering the cylinder with an inclined direction, due to tangential admittance into the pipe or chamber.

The invention will be fully understood upon reference to the accompanying drawings, in which:

Figs. 2 and 3 are central vertical sectional views showing diagrammatically the paths of air inside of the cylinder when the piston first opens the inlet ports, and later, when the ports are fully opened, respectively.

Figs. 4 and 5 are transverse sections through the cylinder in the zone of the inlet ports, with air flow paths corresponding respectively to Figs. 2 and 3.

Figs. 7 and 8 are transverse sections of the embodiment of Fig. 6, and corresponding to Figs. 4 and 5 respectively.

Fig. 9 is a transverse section of yet another embodiment.

Figure 1:
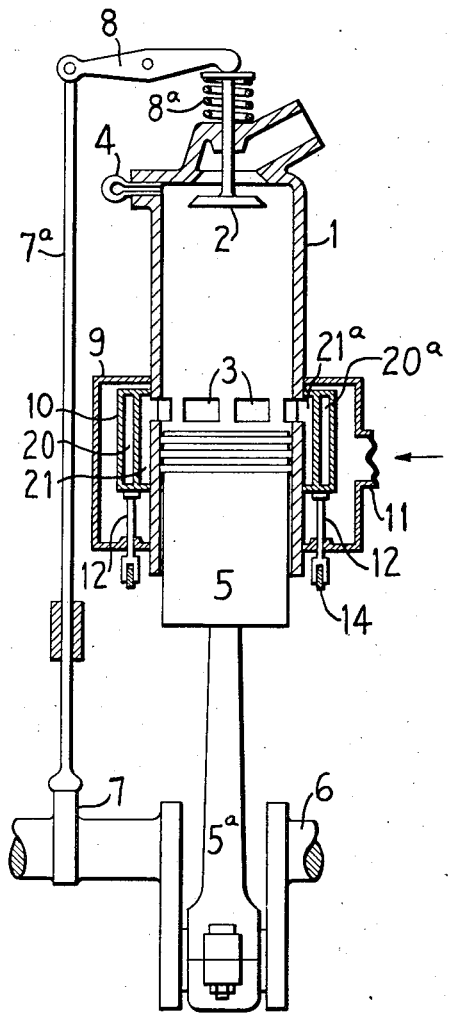
Fig. 1 is a central vertical section of an engine constructed in accordance with the invention.

The cylinder 1 is provided with an exhaust or outlet valve 2 at the top end, and at the bottom end with air inlet ports 3. The liquid fuel is injected into the cylinder at the right point of time in each cycle through nozzle 4, as is common practice for Diesel engines. The inlet ports 3 are gradually uncovered or set free by the piston 5 traveling toward its bottom dead center, the piston connected by rod 5ª with crankshaft 6. The valve 2 is controlled from the crankshaft 6 through a cam 7, a push rod 7ª and a rocker 8, while a spring 8ª assures a quick closing of valve 2. The cylinder 1 is surrounded at the zone of inlet ports 3 by an air reservoir 9, inside of which there is a ring pipe or chamber 10 girding the inlet ports 3. Said annular chamber 10 is supplied with air coming from air reservoir 9 through apertures 20 in tangential direction, and said reservoir 9 may be fed with air through its entrance pipe 11 by a blower in known manner.

The general operation of the engine is as follows: When the expansion stroke is nearly accomplished and inlet ports 3 are still covered by the piston, the exhaust valve 2 is opened, so that the burnt gases, which are at pressure inside of the cylinder, may partially escape from the cylinder 1 through valve 2. At once the pressure inside of the cylinder is lowered to a suitable figure, as the upper corner of piston 5 reaches the ports 3, and commences to uncover them.

Then air enters the cylinder and begins to scavenge the burnt gases. In the meantime the piston reaches its bottom dead center, and returns; after ports 3 and valve 2 have been closed the air trapped in the cylinder becomes compressed, and at the end of compression stroke fuel is injected through nozzle 4 into the combustion space. After passing the top dead center expansion again takes place, and the cycle repeats itself over and over again.

In order to obtain operation in accordance with the invention, the pipe or wall 10 girding the ports 3 is provided with inlet apertures 20, through which the air resting inside of the reservoir 9 is admitted through said wall into the annular chamber in a tangential direction. Said apertures 20 may be of any desired number; there may be a single one of them, or two, 20, 20a, as in Figs. 1 to 8, or even more, as in Fig. 9, in order to obtain best results. Wall 10, or each of its sections, is or are bent like a spiral, so that the section of each enclosed compartment is greatest in proximity to each aperture 20 or 20a, and diminishes gradually, and is smallest at the opposite end, at 21 or 21a. The width of these apertures 20, 20a and of the whirling apertures 21, 21a between the various compartments of the chamber may be regulable from the exterior in any desired manner, and eventually connected to be operatively controlled from the crankshaft, as by connections 37—41 to be described.

By the use of the described device scavenging takes place as follows: first, as ports 3 become free, air resting inside of chamber 10 is put in motion, and since the volume within 10 is great enough to keep therein a fairly constant pressure, during the small initial admission of air, there enters no appreciable amount of air from reservoir 9 through the apertures 20, so that for this cause air inside of the pipe has no immediate substantial tendency to whirl, and it enters substantially radially into the cylinder, and thrusts itself up into the nucleus of the cylinder, and flows centrally toward the top of the cylinder. The motions of the air are shown for this action in Figs. 2 and 4 by arrows. During this stage or period the gas near the walls of the cylinder remains relatively stagnant, and the central flow of air is not capable of scouring it.

At the last part of the down stroke of the piston 5 it opens more fully the ports 3, so that a greater quantity of air flows into the cylinder. Now the pressure inside of the chamber or pipe 4 decreases rapidly, and the air entering through apertures 20, 20a begins to whirl inside of the chamber 10 and the air therefore enters the cylinder in a gradually more and more inclined direction, according to the increasing intensity of whirl inside of the pipe. In order that this inclined flow of air into the cylinder be not hindered, the inlet ports 3 must have such a form, that they have no appreciable directing action upon the air, neither when air flows radially, nor when it assumes a more and more tangential direction; the ports should be wide and their walls thin. The motions of air at this stage are indicated by arrows on the Figs. 3 and 5. The inclined inrushing air forms, as it is well known, a rotating and ascending air tube, which scours efficiently the walls and periphery of the cylinder space, and pushes away the burnt gases, which were stagnant only in proximity to said walls.

The first stage or central upflow of scavenging air may continue by momentum during the second stage or whirling upflow so that there is upflow throughout the cylinder until the exhaust valve closes and traps the remaining air under whirl and pressure. Thus is obtained an efficient scavenging with a relatively small quantity of air. The whirling velocity of air becomes greatest towards the end of scavenging period, so that the whirling lingers throughout the compression period, and leads to a better mixing and burning of injected fuel.

In the embodiment of the invention shown on the drawings it is possible, by convenient selection of width of apertures 21, 21a, that the air occupying chamber 10 may continue to whirl intensely even until after the piston starts to close ports 3. On account of whirling apertures 21 a whirl of air lingers inside of the chamber, due to inertia, irrespective of pressure drop between pipe and cylinder, or between reservoir and pipe. Said apertures should have therefore such a size, that whirling motion remains sufficiently strong until the end of scavenging period, but so that it is suitably reduced before the beginning of the succeeding scavenging period. Said residual whirling of air, to the small extent that it continues, has also the effect of increasing and strengthening still further the whirl of air produced inside of the cylinder by the inclined entry of air therein; but such residual whirl is far too weak to prevent the desired approximately radial initial air inflow and described scavenging action.

The operation of the invention as so far described may have the inconvenience that starting of the engine is rendered difficult, owing to the cooling of the air contacting the walls of the cylinder, which are relatively cold. It is possible with this invention to prevent this inconvenience, by rendering pipe or chamber 10 slidable along the cylinder, so that ports 3 may be put directly in connection with air reservoir 9 during starting of the engine, while during normal operation they are fed indirectly through the chamber. By setting the chamber in an intermediate position may be obtained an adjusted rate of whirl of scavenging air suitable to each a desired working condition of engine. For such adjustment an accessible rod or handle 12 may be connected to slide the pipe or chamber within the reservoir, two rods being shown, with a common yoke 14.

Figure 6:
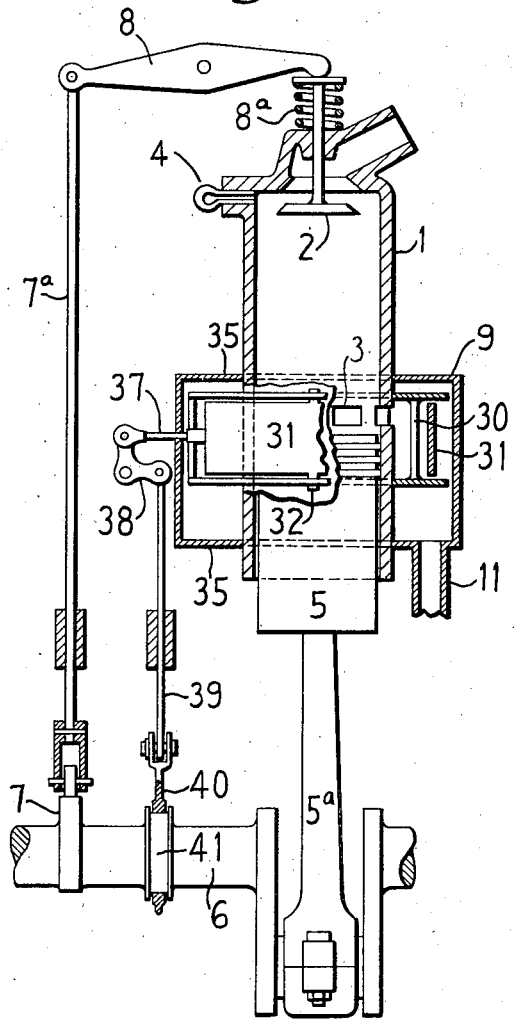
Fig. 6 is a central vertical section of another embodiment of the invention.

In the embodiment of the invention shown in Figs. 6 to 8; the engine has the same elements as in Fig. 1, but the chamber or pipe 10 is constituted of spiral walls 30 and 31 assembled with upper and lower discs 35. One of said walls is rotatably mounted on a pivot 32, so that one may vary at will the width of the apertures 20c, 20d by swinging said wall 31 in the one or the other direction. If these movements are desired to occur automatically there may be used a rod 37 swingably operated by a rocking lever 38, controlled by simple connection from the crankshaft, such as rod 39, pitman 40 and eccentric 41 on the shaft. The operating relation between said parts should be such as to open apertures 20c, 20d at the beginning of each scavenging period, and close them gradually during scavenging itself.

The absolute and relative widths of the various apertures or ports bear very largely on the working of the device embodying the invention, for they control by their mutual ratio the amount of inclination of air flow entering into the cylinder, at the end of the scavenging period. The better working of the engine that one may obtain with small apertures 20 is generally more important than the loss of energy due to the need of a higher pressure for forcing the scavenging air through the smaller apertures into the cylinder.

The direction assumed by the air in its entry into the cylinder depends on the velocity of air flow inside of the pipe, which velocity depends on the intensity of flow and on the width or section of the passages or apertures which it must pass through. The variation or progressive increase of velocity during the scavenging period occurs according to this invention on account of the variation of the intensity of air flow, i. e. of greater or lesser width of inlet ports. It is practicable however to use mechanical means, instead of aerodynamical only, for controlling the velocity of whirling air by means of variation of the width of apertures 20. The example given in Figs. 6 to 8 with a movable wall 31 makes it possible to give to the air entering the chamber during scavenging period a far quicker rate of increase of velocity, such that there is obtainable a far lesser velocity at the beginning of scavenging, and a far higher one at the end of same, and improving the action of the invention.

Such periodic movement of walls 31 in each cycle may be effected even automatically. For this purpose it is sufficient that said walls be journalled free on a pivot 32, or at least under the action of a spring, the portion 33 of wall 31 being greater than the portion 34 of the same. Under such conditions the walls are operated by aerodynamic actions of air flowing through the pipe.

Operation of the walls 31 may be effected by hand or mechanically, or automatically as already described, and the rate of movement may be regulated in a suitable manner, in order to obtain the best scavenging effect with each selected running speed of the engine, and with each kind of fuel used for injection.

In Fig. 9 instead of two spiral or swinging walls there are six swinging walls 45 in the form of vanes, each pivoted at 46 and adjustable in unison to change the speed and tangency of inflow from the reservoir 9 into the chamber surrounding the ports 3. Short arms 47 on the walls are connected by links 48, while a rod 49 extends to a control point, manual or automatic.

An internal combustion engine has thus been described attaining the advantages recited; since many matters of combination, arrangement and construction may be variously modified without departing from the principles of the invention it is not intended to limit the invention to such matters except to the extent set forth in the appended claims.

I claim:

1. In a two-cycle internal combustion engine with unidirectional flow of whirling scavenging air and piston-controlled inlet ports for said air, each of said ports having a relatively large circumferential dimension, a chamber girding the cylinder in the zone of said inlet ports, compressed air inlet apertures provided in the outer walls of said chamber adapted to admit compressed air into the said pipe during scavenging period in an inclined direction to cause circular air flow therein.

2. In a two-cycle internal combustion engine with unidirectional flow of whirling scavenging air and piston-controlled inlet ports for said air, an annular chamber girding the cylinder in the zone of said ports, apertures provided on the walls of said chamber, and adapted to admit air into said pipe during scavenging period in a nearly tangential direction, the cross-sectional area of each of said apertures being less than the cross-sectional area of each of said ports.

3. In a two-cycle internal combustion engine having unidirectional scavenging air flow, in combination with the cylinder having relatively wide air inlet ports near its lower end and the piston adapted to uncover such ports at the end of its downward stroke, a wall surrounding and spaced from the cylinder affording an annular air inlet chamber leading to said ports, and means conducting supply air to such chamber in a tangential manner; whereby as the piston first uncovers the ports the air will enter radially to scavenge the center of the cylinder, whereas as the air inflow increases it assumes a whirling motion to scavenge the periphery of the cylinder.

4. An engine as in claim 3 and wherein the wall forming the inlet chamber may be bodily shifted longitudinally of the cylinder away from or into registration with such ports to change the scavenging action.

5. An engine as in claim 3 and wherein the chamber wall is of approximately spiral arrangement, and has means for adjusting its pitch to vary the whirling action of the entering air and thereby the degree of slant in flowing from the chamber into the cylinder.

6. In a two-cycle internal combustion engine with unidirectional flow of whirling scavenging air, means adapted to admit air into the lower part of the cylinder, first, radially and later in the scavenging period more and more nearly tangentially, and an exhaust valve arranged substantially centrally in the head of the cylinder, with means automatically opening the exhaust valve shortly before the admission of air and closing it before combustion.

7. A two-stroke cycle internal combustion engine of the type having unidirectional flow of scavenging air, admitted through a series of inlet ports arranged around the lower end of the cylinder wall to be uncovered and covered by the piston, and exhausted through a valve-controlled outlet port at the upper end of the cylinder, characterized in that the inlet ports are relatively wide circumferentially in respect to the cylinder wall thickness so as not to determine the direction of inflow, with an annular air chamber of substantial volume surrounding the cylinder located to deliver through said inlet ports to the cylinder, and a compressed air supply passage arranged to deliver tangentially into said chamber during scavenging to cause circular air travel in the chamber; whereby when the descending piston first uncovers the inlet ports, the static air passes radially from the chamber into the cylinder, the opposing streams meeting centrally and rising to scavenge the central portion of the cylinder space, whereas thereafter due to circular acceleration of the air entering the chamber such air passes from the chamber to the cylinder more and more nearly tangentially producing a whirling motion scavenging the peripheral portion of the cylinder space.

8. A two-stroke cycle internal combustion engine of the type having unidirectional flow of scavenging air, admitted through a series of inlet ports arranged around the lower end of the cylinder to be opened and closed by the movements of the piston, and exhausted at the upper end of the cylinder, characterized in that the inlet ports are sufficiently wide circumferentially to permit changes in direction of inflow, with an air chamber or chambers of substantial radial width exterior to the cylinder and located to deliver through said inlet ports to the cylinder, and a forced air supply passage arranged to deliver into said chamber or chambers to cause circular air travel therein during scavenging; whereby when the descending piston first opens the inlet ports the initial air inflow streams pass radially into the cylinder, meeting centrally and rising to scavenge the central portion of the cylinder space, whereas thereafter due to acceleration of the air traversing the chamber or chambers the streams enter the cylinder more and more slantingly producing a whirling motion scavenging the peripheral portion of the cylinder space.

9. An engine as in claim 8 and wherein the air chamber is an annular channel around the cylinder, and having an air pressure reservoir external to the chamber, with spirally arranged walls providing tangential openings from the reservoir into the chamber; whereby after scavenging has begun a velocity travel of air around the annular channel is established, impressing a more and more nearly tangential inflow from the channel through the ports into the cylinder.

10. An engine as in claim 8 and wherein the air chamber has a spirally arranged wall, and surrounding the same an air pressure reservoir, said wall affording a tangential opening from the reservoir to the chamber to produce circular air travel in the chamber during scavenging.

11. An engine as in claim 8 and wherein the air chamber has a spirally arranged wall, and surrounding the same an air pressure reservoir, said wall affording a tangential opening from the reservoir to the chamber to produce circular air travel in the chamber during scavenging; said spirally arranged wall being fitted to swing to vary the opening into the chamber, with connections for automatically swinging the wall in each cycle to vary the width of such opening during the progress of the scavenging action.

12. The method of supplying scavenging and combustion air to the cylinder of a unidirectional-air-flow two-stroke-cycle internal-combustion engine consisting in introducing the air into the lower end of the cylinder first in a series of substantially radial air streams converging to the cylinder center and rising to scavenge the central portion of the cylinder space and thereupon causing such streams to enter at progressively increasing slants whereby to establish whirling airflow to scavenge the peripheral portion of the cylinder space.

13. A two-stroke cycle internal combustion engine of the type having unidirectional flow of scavenging air, admitted through a series of inlet ports arranged around the lower end of the cylinder wall to be uncovered and covered by the piston, and exhausted through a valve-controlled outlet port at the upper end of the cylinder, an annular air chamber of substantial volume surrounding the cylinder located to deliver through said inlet ports to the cylinder, a compressed air supply passage arranged to deliver tangentially into said chamber during scavenging to cause circular air travel in the chamber, whereby due to tangential travel of the air entering the chamber the air enters the cylinder at a substantial slant producing a whirling motion of the scavenging air, and means for bodily displacing away from the zone of such inlets said air chamber to permit wholly radial admission of air to the cylinder, for example during starting of the engine when cold.

14. A two-stroke cycle internal combustion engine of the type having unidirectional flow of scavenging air, admitted through a series of inlet ports arranged around the lower end of the cylinder wall to be uncovered and covered by the piston, and exhausted through a valve-controlled outlet port at the upper end of the cylinder, an annular air directing means surrounding the cylinder having passages located to deliver inclinedly through said inlet ports to the cylinder, a compressed air supply arranged to deliver into said passages during scavenging, whereby due to inclined travel of the air in said passage the air enters the cylinder at a substantial slant producing a whirling motion of the scavenging air, and means for bodily displacing away from the zone of such inlets said air directing means to permit wholly radial admission of air to the cylinder.

15. A two-stroke cycle internal combustion engine of the type having unidirectional flow of scavenging air, with piston controlled inlet ports near the lower end and an overhead exhaust valve; characterized in that the inlet ports are so relatively wide so as to permit either radial or inclined inflow of air, and a shiftable air control device exterior to the cylinder and containing inclined air directing passages, the same arranged in one position, surrounding the inlet ports, to feed air tangentially to the ports whereby to generate in the cylinder a whirling motion of scavenging air, and being bodily shiftable longitudinally from such position to a second position to bring about a substantially radial inlet of scavenging air.

16. A two-stroke-cycle internal-combustion engine of the type having unidirectional flow of scavenging air, with piston-controlled inlet ports near the lower end and an overhead exhaust valve; characterized in that said inlet ports are so relatively wide so as to permit either radial or inclined inflow of air, and a shiftable air control device exterior to the cylinder, the same arranged in one adjustment to feed air tangentially to said ports whereby to generate in the cylinder a whirling motion of scavenging air, and in another adjustment to bring about a substantially radial feed of air to said ports for radial inlet of scavenging air.

17. A two-stroke-cycle internal-combustion engine of the type having piston-controlled inlet ports and an overhead exhaust valve; said engine comprising in combination the engine cylinder formed with such piston-controlled inlet ports and such inlet ports being wide in relation to the cylinder wall thickness so as to permit either radial or inclined inflow of air through said ports, an air supply chamber exterior to the cylinder, comprising air directing walls arranged inclinedly to feed air tangentially to said ports whereby to generate in the cylinder a whirling motion of scavenging air, and means whereby said chamber may be temporarily displaced from its operative position, thereby to cause a radial inlet of scavenging air through said ports, without whirling motion in the cylinder.

PIER GIORGIO VANNI.